United States Patent Office 3,515,368
Patented June 2, 1970

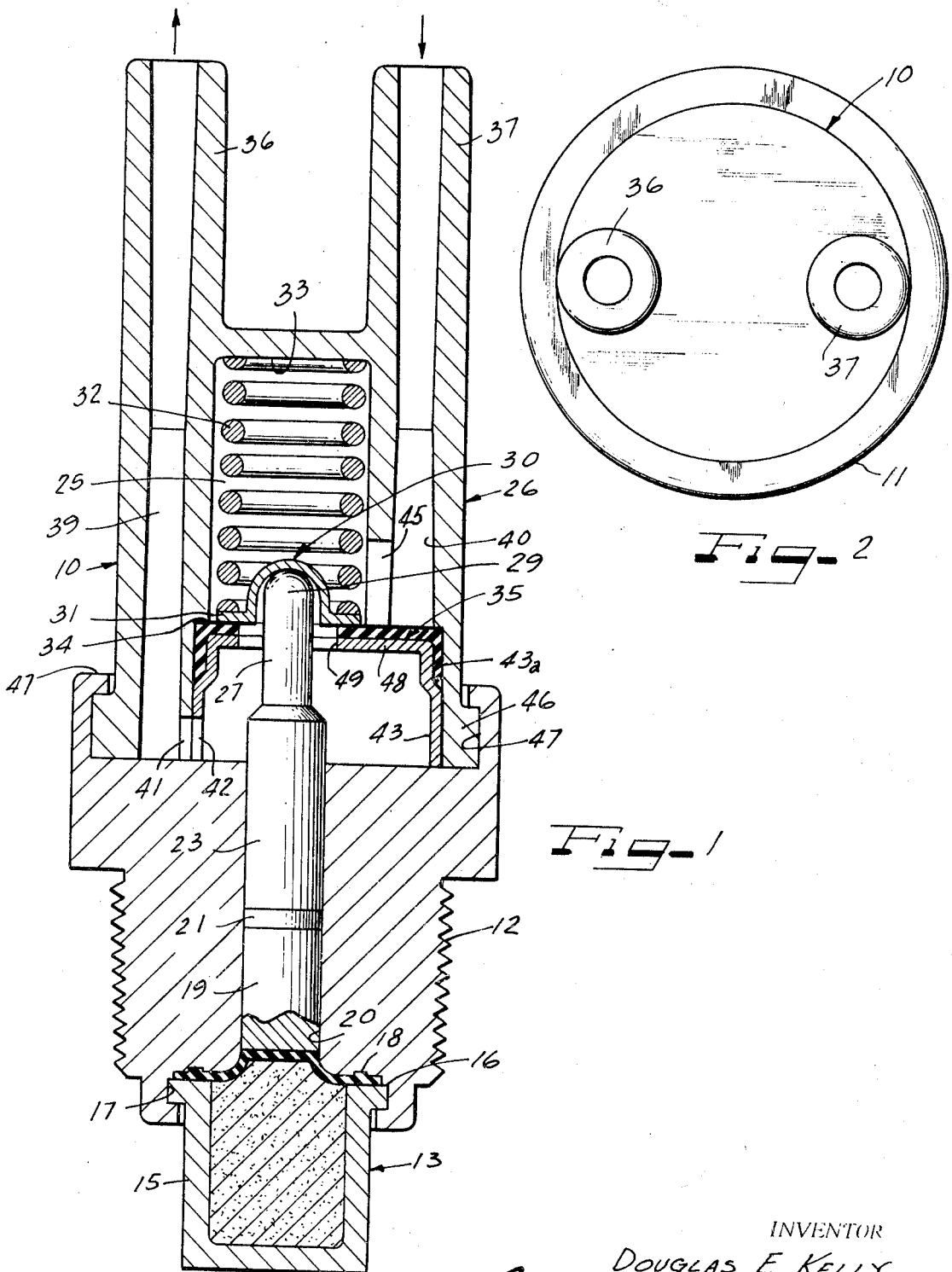

3,515,368
THERMALLY RESPONSIVE ON AND OFF VACUUM CONTROL VALVE
Douglas E. Kelly, Farmington, Mich., assignor to Eaton Yale & Towne Inc., a corporation of Ohio
Filed Sept. 11, 1968, Ser. No. 758,990
Int. Cl. F16k *31/00;* F02b *5/04*
U.S. Cl. 251—11    9 Claims

ABSTRACT OF THE DISCLOSURE

Thermally responsive valve controlling the automatic spark advancer of an internal combustion engine. The valve has a symmetrical valve housing having an inner valve chamber having a cylindrical wall, concentric with the axis of the valve housing. A flow chamber having a cylindrical wall eccentric of the axis of the wall of the valve chamber leads from the valve chamber and opens through the bottom of the valve housing. The bottom of the valve housing is closed by a base positioning a thermal element in the flow of coolant. The thermal element has an extensible piston extending along the base into the valve chamber and having a poppet type of valve mounted on its end, concentric with the valve chamber. A round seat for the valve is pressed into the valve chamber and has an eccentric port cooperating with the valve. The flow chamber has communication with a vacuum output at one level and with a vacuum outlet at a different level. The vacuum output and outlet lead along opposite sides of the valve chamber and terminate into vertical nipples.

SUMMARY AND OBJECTS OF THE INVENTION

Simplified on and off vacuum control valve, inexpensive to manufacture, in which the vacuum flow chamber has a cylindrical wall eccentric of the cylindrical wall of the valve chamber, to facilitate the porting of the valve and enable the valve seat, valve and valve body to be constructed from round dies and to provide a symmetrical outside appearance of the valve, positioning the vacuum output and outlet nipples in the proper positions for connection to manifold or carburetor vacuum and to the distributor and automatic spark advancer of the internal combustion engine.

A principal object of the present invention, therefore, is to provide a simple and improved form of on and off valve, particularly adapted to control the vacuum to the distributor of an internal combustion engine to automatically advance the spark upon changes in temperature in the engine.

Another object of the invention is to provide a thermally responsive on and off vacuum control valve for internal combustion engines, so arranged as to advance the spark only upon the reaching of a predetermined engine temperature.

Still another object of the invention is to provide a vacuum control valve simple to manufacture, of a symmetrical construction, in which the valve chamber and passageways may have cylindrical walls and in which communication between the passageways is afforded by a flow chamber having communication with the valve chamber and the vacuum passageways and having a round wall eccentric of the valve chamber and forming a mounting for a round valve seat insert having a port leading therethrough for cooperation with a thermostatic valve in the valve chamber, and concentric with the center of the valve chamber.

Another object of the invention is to provide a simple form of vacuum control valve adapted to be threaded in the cylinder head of an internal combustion engine and of a symmetrical construction with vertical nipples extending from one end thereof, for connecting the automatic spark advancer of the distributor to a source of vacuum, and affording an efficient and simplified form of vacuum control valve in which the nipples for connection to the distributor and the source of vacuum are in the proper orientation for ease in connection to the distributor and vacuum manifold and to simplify the construction of the valve.

These and other objects of the invention will appear from time to time as the following specification proceeds and with reference to the accompanying drawings wherein:

FIG. 1 is a vertical sectional view of a thermally responsive on and off vacuum control valve constructed in accordance with the principles of the present invention; and FIG. 2 is a top plan view of the valve shown in FIG. 1.

In the embodiment of the invention illustrated in the drawings, I have shown a vacuum control valve 10 including a base 11 having a threaded nipple 12 which may be threaded in the cylinder head of an internal combustion engine and position a thermally responsive element 13 in the water jacket of the engine.

As shown in FIG. 1 the thermally responsive element 13 is a so-called power type of thermally responsive element including a casing 15 having a flange 16 extending outwardly of its inner end within a cylindrical bore 17 of the base 11 and crimped thereto by crimping the wall of the bore over the flange 16.

The casing 15 may contain a wax containing a powdered metal heat conducting material and a binder, which reacts against a diaphragm 18 extending across the flange 16 within the base 11, and sealed to said flange by the operation of crimping the wall of the bore 17 over the flange 16. The diaphragm 18 reacts against a plug 19 extending along a central bore or passageway 20, extending axially along said base and opening to opposite ends of said base. The plug 19 abuts a disk 21 at its upper end. The disk 21 forms a seat for a piston 23 extending along the central bore 20 along a vacuum flow chamber 24 into a valve chamber 25 and forming the power member for the thermally responsive element. The flow chamber 23 and valve chamber 24 are formed in a casing or housing 26 and are in axial communication with each other. The piston 23 has a reduced diameter upper end portion 27 having a dome-like upper end 29 extending within the internal generally spherical wall of a dome-like valve 30. The valve 30 is a poppet type of valve and has a flange 31 extending radially of the dome-like wall thereof, the under surface of which forms the valve element of the valve. A compression spring 32 in the valve chamber 25 is seated on the flange 31 and extends along the valve chamber 25. The opposite end of said spring is seated in a top wall 33 of said valve chamber. The spring 32 biases the piston 23 and plug 19 in a retracted position with respect to the base 11 and biases the valve element of the valve in engagement with a resilient valve seat 34 extending across the top of a valve seating member 35, seated in the flow chamber 24, as will hereinafter more clearly appear as this specification proceeds.

The valve housing or casing 26 has two parallel nipples 36 and 37 extending from the top thereof and axially along the valve housing 26 and valve chamber 25. The nipples 36 and 37 have communication with axially aligned passageways 39 and 40, leading along the valve housing and along the outside of the valve chamber 25. The nipple 36 may have connection with a source of vacuum such as the vacuum manifold of an internal combustion engine or the Venturi of the carburetor of"

the engine and leads along the valve housing to the bottom thereof. The passageway 39 has communication with the flow chamber 24 through a transverse passageway 41 leading through the wall of the flow chamber adjacent the bottom thereof and an aligned transverse passageway 42 leading through a cylindrical wall 43 of the valve seating member 35.

The nipple 37 may have connection with the distributor of the internal combustion engine to supply the vacuum necessary to operate the spark advancer to advance the spark, when the coolant of the engine reaches a predetermined operating temperature for the engine.

The passageway 40 leading along the valve housing has communication with the valve chamber 25 through a transverse passageway 45 leading through the wall of said valve chamber, and also opens at its lower end to the valve seating member 35.

As shown in FIG. 1, the valve housing or casing 26 has a flange 46 extending about its lower end and extending along a cylindrical wall portion 47 of the base 11. The valve housing is retained to the base 11 in abutting engagement with the top of said base as by crimping the wall portion 47 inwardly along the top surface of the flange 46.

The valve seating member 35 is shown as being of an inverted cup-like form, including the cylindrical wall 43, pressed into engagement with the cylindrical wall of the flow chamber 24, and having a flat top portion 48 having the valve seat 34 extending thereacross and along an upper recessed portion 43a of the cylindrical wall 43. A port 49 leads through the top portion 48 and seat 34. The piston or power member 23 extends through the port 49 axially of the center thereof, and is retractable along the port 49 upon reductions in temperature, to accommodate the flange 31 of the valve 30 to engage the resilient seat 34 and shut off the flow of vacuum from the distributor to the intake manifold or other source of vacuum of the internal combustion engine.

The wall 43 of the valve seating member 35 is thus cylindrical and is pressed into engagement with the cylindrical wall of the flow chamber 24 to seal the wall of said flow chamber when the valve 30 is closed. The valve seating member 35 and the flow chamber 24 are thus symmetrical and round and eccentric of the valve chamber 25. The port 49, however, is concentric of the valve chamber and the power member 23 to provide a free flow of fluid along the passageway 40 and out through the passageway 39 when the valve is open.

The valve housing 26 has a cylindrical wall concentric with the center of the valve chamber 25 and is so arranged as to accommodate the valve chamber and flow chamber to be formed by eccentric round bores, to provide a simplified porting between the passageways 40 and 39 and to accommodate the pressing of a round seating member into the round flow chamber, with its port eccentric of the center of the flow chamber but concentric with the axial center of the round valve chamber.

I claim as my invention:

1. In a thermally responsive on and off vacuum control valve particularly adapted for automatic spark advancers for internal combustion engines,
   a valve housing,
   an outlet from said housing adapted to be connected with a source of vacuum,
   a vacuum output leading into said housing and adapted to be connected with an automatic spark advancer and the like,
   a valve chamber within said housing and extending therealong, a base for said housing for mounting in the engine block of an internal combustion engine,
   a thermal element carried by said base and adapted to be positioned by said base in the water jacket of an internal combustion engine,
   said thermal element having an extensible power member, extensible along said base upon predetermined increases in temperature,
   a valve on said power member movable along said chamber upon increases in temperature,
   spring means retractably moving said power member and biasing said valve into a closed position,
   a seating member for said valve within said housing having a port leading therethrough,
   a flow chamber within said housing forming a mounting for said seating member and affording communication between said vacuum outlet and said vacuum output through said port,
   said flow chamber having a cylindrical wall positioning said flow chamber in registry with one of said passageways and positioning said seat eccentrically of said valve, and said valve chamber,
   and said port being concentric of said valve chamber and eccentric of said seating member.

2. The thermally responsive valve of claim 1, wherein said valve seating member is in the form of an insert pressed into engagement with the wall of said flow chamber.

3. The thermally responsive valve of claim 2, wherein the valve is in the form of a poppet valve concentric with said valve chamber and port.

4. The thermally responsive valve of claim 1, wherein the valve chamber has an internal cylindrical wall concentric with the center of said valve housing, wherein the flow chamber has an internal cylindrical wall eccentric of the internal cylindrical wall of said valve chamber, and wherein the valve seating member is of an inverted cup-like form having a top surface facing said valve and having said port leading therethrough and having a cylindrical wall extending from said top surface eccentric of said valve chamber, and having sealing engagement with said cylindrical wall of said flow chamber.

5. A thermally responsive on and off vacuum control valve in accordance with claim 4, wherein said vacuum outlet and said vacuum output extend axially along said valve housing along the wall thereof and along opposite sides of said valve chamber and have flow communication with said flow chamber at their inner ends on opposite sides of said valve seat insert.

6. An on and off thermally responsive valve having a valve housing having an outer wall concentric with the center of said valve housing,
   a valve chamber within said housing having a cylindrical wall concentric of the axis of said valve housing,
   a flow chamber at the lower end of said valve chamber and forming a continuation thereof,
   a vacuum outlet nipple extending from the top of said valve chamber and a vacuum outlet passageway having communication therewith, extending along said housing to one side of said valve chamber and opening to said flow chamber through the wall thereof,
   a vacuum output nipple extending vertically of said valve chamber parallel to said vacuum outlet nipple, and a vacuum passageway extending axially along said housing to one side of said valve chamber and having communication with said valve chamber through the wall thereof,
   means affording communication between said vacuum outlet and said vacuum output and blocking the flow of vacuum from said output through said outlet comprising a valve member movable along said valve chamber concentric with the center thereof,
   a power member forming a mounting for said valve member, and
   a thermally responsive element effecting extensible movement of said power member,
   a valve seat of an inverted cup-like form having a cylindrical wall pressed into sealing engagement with said cylindrical wall of said flow chamber and having a top wall separating said valve chamber from said flow chamber and having a port leading therethrough, cooperating with said valve to control the flow from said vacuum output through said vacuum outlet.

7. The thermally responsive on and off valve of claim 6,
wherein the flow chamber is eccentric of said valve chamber and opens to the bottom of said housing,
wherein a base forms a mounting for said thermally responsive element and closes said flow chamber, and
wherein said port is concentric of said valve chamber and eccentric of said flow chamber.

8. A thermally responsive on and off vacuum control valve in accordance with claim 7,
wherein said extensible power member has a dome-like upper end extending within said valve chamber concentric of the center thereof,
wherein said valve is of a dome-like form having a generally spherical interior wall seated on said dome-like end of said power member, and having a flange extending radially of said spherical wall and having a bottom valve element having sealing engagement with said seat, about said port, and
wherein a spring is seated on the top surface of said flange and biases said power member into a retracted position and said valve element into sealing engagement with said seat.

9. A vacuum control valve in accordance with claim 8,
wherein said housing has a cylindrical wall,
wherein said valve chamber is concentric with the axis of said cylindrical wall,
wherein said base and said thermally responsive element are concentric with said cylindrical wall, and
wherein said flow chamber and said seat are disposed eccentric of said cylindrical all and open to the bottom of said housing in communication with said base.

References Cited

UNITED STATES PATENTS 3,397,859  8/1968  Barnett.
3,400,698  9/1968  Kelly.

ARNOLD ROSENTHAL, Primary Examiner

U.S. Cl. X.R.

123—117.1, 976